Feb. 24, 1970 H. HOFF 3,497,194
APPARATUS FOR THE REMOVAL OF DUST FROM CONVERTER GASES
Filed Sept. 19, 1967 2 Sheets-Sheet 1

INVENTOR.
HANS HOFF
BY
Karl F. Ross
ATTORNEY

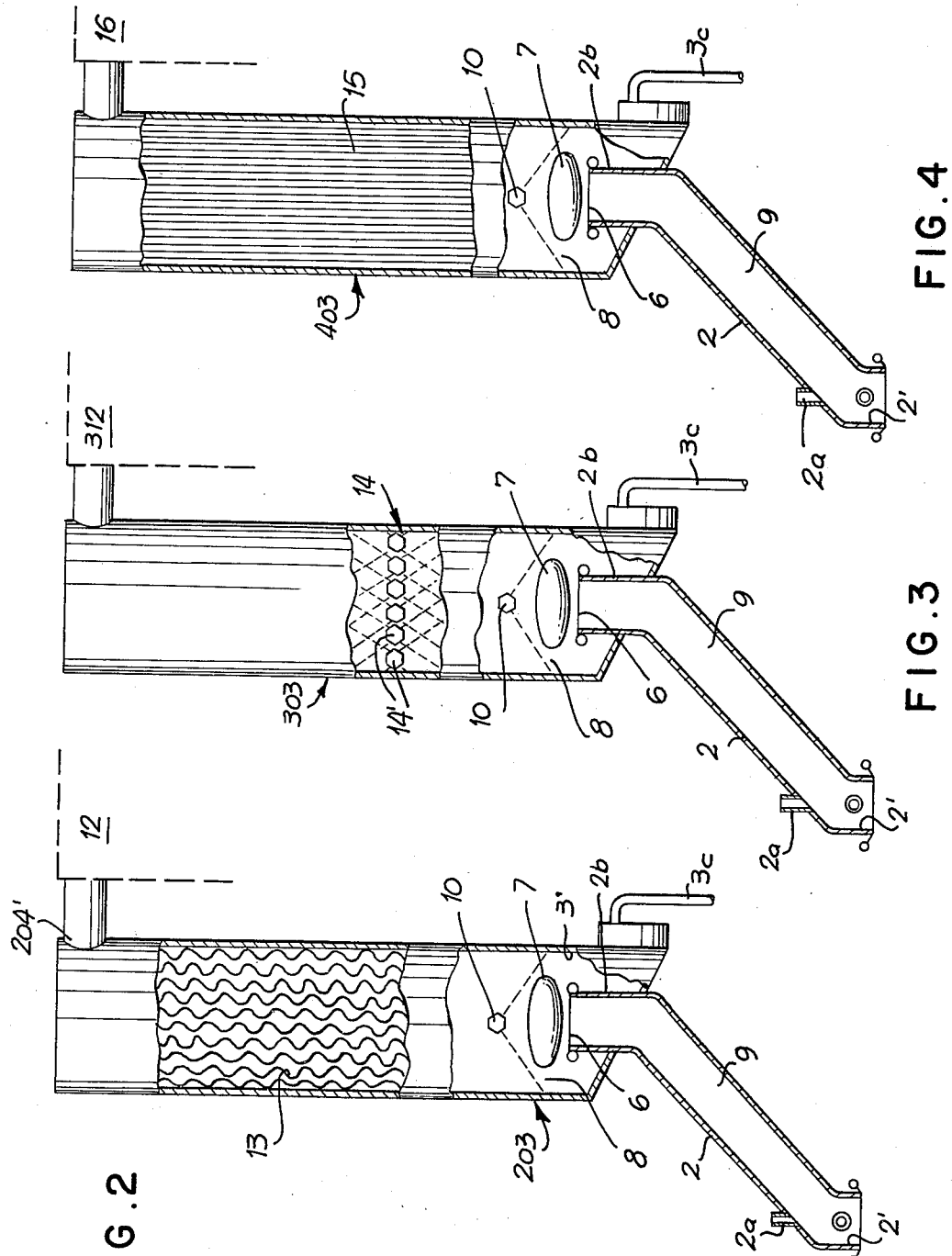

United States Patent Office 3,497,194
Patented Feb. 24, 1970

3,497,194
APPARATUS FOR THE REMOVAL OF DUST FROM CONVERTER GASES
Hans Hoff, Essen-Bredeney, Germany, assignor to Firma Gottfried Bischoff Bau Komp. Gasreinigungs- und Wasserruckkuhlanlagen Kommanditgesellschaft, Essen, Germany, a corporation of Germany
Filed Sept. 19, 1967, Ser. No. 668,806
Claims priority, application Germany, Sept. 24, 1966, H 60,584
Int. Cl. F27d 23/00; C21c 5/40; B01d 47/06
U.S. Cl. 266—16                               7 Claims

ABSTRACT OF THE DISCLOSURE

An installation for the treatment of dust-laden combustible exhaust gas of a steel-making converter in which the $O_2/CO$ reaction is carried out to completion in a gas-collection tube having a length of 5 to 20 meters and oriented to sustain an air-factor $n$ of 0.05 to $\leq n \leq$ 0.5, the tube opens upwardly into a dust-separating column and directs the gas against an impingement body above which a nozzle is provided to direct wash water into the gap between the impingement baffle and the wall of the column. Thereafter, the gases pass through a dust-collecting unit.

---

Figure 1:
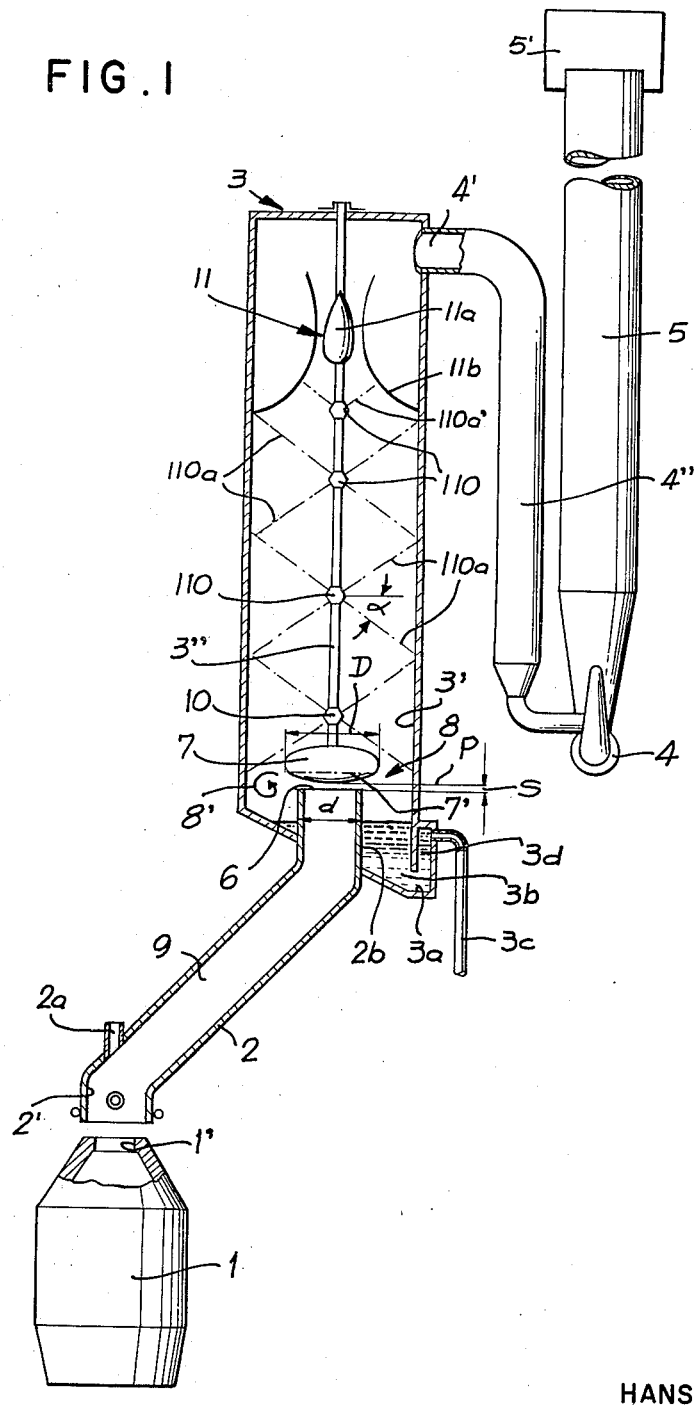

My present invention relates to an appartus for the removal of dust from and for the burn-off of converter gases and, more particularly, to improvements in such apparatus directed to reducing pollution of the atmosphere as a result of the disposal of furnace exhaust gases in this manner.

In my copending application Ser. No. 564,983, filed July 13, 1966, now Patent No. 3,372,528, I have described and claimed a system for the purification of metallurgical waste gases, especially those from steel-making converters and other furnaces, this apparatus being particularly suitable for the removal of dust and other particulate matter therefrom. The dust entrained in furnace exhaust gases, consisting of products of combustion, entrained, molten-metal particles, finely divided condensate and the like, usually has a particle size ranging from $10^{-3}$ to $10^2$ microns. The removal of such dust and particulate matter has been a problem long confronting the metallurgical industry, particularly where the exhaust gases contain large quantities of combustibles as well as high-boiling components which condense upon even the slightest cooling of the gas. In the system described in the aforementioned application, these disadantages of electrical-precipitation purifiers and fabric filters are avoided with an arrangement wherein the gases of a steel-making converter are gathered by a gas-collecting hood and led through a cooling duct or stack which is dimensioned to precool the hot exhaust gases prior to their introduction into a waste-dust-removal section. In this apparatus, the dust-laden gases are treated with water in trickle, counterflow and separate washing arrangements to effect dust precipitation in the water droplet and further cool the gases. The collected dust is recovered at a sledge from the washing liquid which may be recirculated after purification. Downstream of the washing column, the gas passes through a dry electrostatic precipitator whereby electrostatic fields induce adhesion of the particulate matter to screens or other charged collection surfaces. A bypass of the waste-treatment station shunts dry gas at an elevated temperature from the cooling state to the outflow of the washing ower to bring the temperature of the gas thereat and its humidity to an appropriate value for effective electrical precipitation. In that system, moreover, automatic control means is provided which, in response to sensing devices, meters the bypass gas to maintain optimum parameters at the electrical precipitator.

Apart from this system, however, the industry makes use of a number of dust-recovery system designed to purify the gases prior to their release to the atmosphere. Washing systems, for example, include, in addition to trickle towers, annular-gap (high-speed gas flow) washers in which the gas is constrained to flow through gaps of relatively small flow-cross-section for intimate treatment by the washing liquid. The electrical precipitators, which may be used in conjunction with waste washers or independently thereof, are of the wet or dry type, while sedimentation solid/gas separators and filters are also common. In all of these systems, the relatively large operation expense and capital cost have limited the degree to which contaminants can be removed from the gas stream. It will be understood that the finer the filter, the more readily does it become contaminated and requires replacement and the greater the pressure drop and requirement for energy to displace the gases through the purification system. The same holds true for the other modes of removing dust from converter gases and eliminating the waste.

It is, therefore, the principal object of the present invention to provide an improved apparatus for the removal of particulate matter from the waste gases of metallurgical furnaces and especially steel-making converters, whereby the aforementioned disadvantages are avoided.

Another object of my invention is to provide an installation for the treatment of combustible converter-exhaust gases which can be operated at high efficiency, is relatively simple, and is especially advantageous when employed with steel-making converters and other generators of metallurgical exhaust gas.

Still another object of the invention is to provide an improved method of operating a purification installation of the general character described.

These objects and others which will be apparent hereinafter can be attained, in accordance with the present invention, by providing as the gas-collecting member above a steel-making converter, an elongated tubular reaction chamber dimensioned to sustain completion of the oxygen/carbon monoxide ($O_2/CO$) reaction. This chamber terminating in a dust-removal device and having, at the mouth of the reaction chamber opening into the dust separator, a deflection body defining with the walls of this dust separator, a vortex chamber for promoting cyclonic movement of the gases emerging from the elongated reaction chamber or stack. It has been discovered that, when the inlet cross-section or collecting area of the reaction chamber is dimensioned to provide an air factor (air factor $n = A/A_0$, where A is the volume of combustion air introduced into the reaction chamber and $A_0$ is the total exhaust gas volume from the converter) $0.05 \leq n \leq 0.5$ and where the length $l$ of the reaction tube is $5 \leq l \leq 20$ meters. Advantageously, the dust separator is a vertically extending tower at the base of which means is provided for recovery of sediment solids and into which the discharge end of the reaction tube extends coaxially to a level about this base. According to this invention, the column is provided immediately above the deflection body with nozzle means for directing a downward spray of washing liquid into the annular gap between this body and the wall of the dust separator. As will be apparent hereinafter, the dust-separating column, in accordance with conventional techniques, may be provided with an array of liquid-film washing stages, annular gap washers, spray nozzles for countercurrent and trickle washing of the raising gases, wet or dry electrical precipitation devices, heat-exchanger and filter bodies. At the outlet of the dust-separating vessel, I may provide an exhaust device designed to draw the converter gases upwardly through the reaction tube and the dust separator as well as a stack through which purified gases may be released to the atmosphere after burn-off.

The present invention is based upon the fact that conventional apparatus for the removal of dust from combustible exhaust gases and the burning off of the combustible components thereof carry out the oxygen/carbon monoxide reaction predominantly in the dust separator. This procedure reduces sharply the efficiency of the dust-removal operation, especially when the air factor is such as to interfere with or decrease the dust-removal effectiveness. It will be understood that the air factor required to complete combustion increases the volume of gases traversing the dust-removal apparatus and that the oxygen/carbon monoxide reaction is not instantaneous but requires the joint travel of added air and the combustible gases along the dust-removal path. Under these circumstances, some of the dust-removal stages may be ineffective as to the products of combustion, the dimensions of the dust-recovery chamber may be unsatisfactory for complete combustion of the gases, etc.

By contrast, the present invention provides for the completion of combustion in the reaction tube whose length is selected to ensure, for converter or steel-making converter gases and at the air factor indicated previously, a complete interaction and creates the optimal air factor in the reacted gases for the subsequent dust-removal operation.

Surprisingly, the collection and reaction tube, which has a length of 5 to 20 meters (m.), dissipates sufficient heat (from the sensible heat of the gas and the reaction heat generated in the chamber) that special cooling systems (e.g. double-wall structures) and water or steam cooling of the tube are not required. The converter gas, after passing through the reaction chamber, is introduced via a unique connection to the colmun, this connection comprising a deflection or impingement baffle disposed ahead of the discharge end of the reaction chamber and at a distance from this end which is a minor fraction of its diameter. The deflection or impinging body defines an annular gap with the wall of the column into which the gases are deflected to induce an intensive turbulence therein without a twisting or vortex movement about the axis of this chamber. This combination has been found to ensure optimal efficiency of gas purification as well as optimal economy of capital expenditure and operational cost. Furthermore, cleaning costs are materially reduced since the reaction chamber is generally upright and preferably has a major portion of its length extending obliquely to its inlet and outlet. Under these circumstances, slag discharges from the mouth of the converter into the reaction tube do not cause significant problems since the tube is essentially self-cleaning. In prior devices, the ejected slag contaminated the dust-collection systems and complex cleaning arrangements were required.

According to another feature of this invention, the elongated tubular gas-collection member forms a reaction chamber whose length corresponds to the length of the $O_2/CO$ reaction path, thereby ensuring completion of the reaction prior to entrance of the gases into the dust-separating column and a reduction of the temperature of the gases to a point below the ingition temperature (about 650° C.) and possibly to the temperature at which dust removal is at an optimum (i.e. 50° to 170° C., depending upon the type of dust-removal processes used). As indicated earlier, the impingement surface is so formed, e.g. with a convexity in the direction of the mouth of the discharge end of the gas-collection chamber, that the turbulence occurring in the annular gap produces vortexes solely in radial planes of the dust-separating column and the gap. The largest particles entrained by the gas are thus separated by impingement processes and sedimentation while the remainder of the gas is intimately mixed with the stream of water sprayed into the annular gap. In the event the reaction is not completed in the tubular gas-collection chamber, the augmented turbulence at the mouth of the dust-removal tube and in the annular gap effects an intimate mixture of the air with the combustible components and permits completion of the reaction before the gases pass upwardly through the column which is provided with cooling means as described in greater detail hereinafter. Explosion in the column is therefore precluded. Part of the washing liquid (i.e. water) contacting the gas in the gap is vaporized and entrained with the gases as steam in the radial vortex which has little if any angular movement about the axis of the column. The gas at the exit of the column is at the desired temperature for filtering, electrostatic precipitation or the like.

The subsequent dust-collection device may consist of conventional differential-pressure or annular-gap washers (see Perry's Chemical Engineers' Handbook, Section 20, pages 77–96; McGraw Hill Publishing Company, 1963) dry electrostatic precipitators, wet electrostatic precipitators or fabric filters. Upstream of the column, a suction means is provided in the form of a blower, high-draft chimney or stack, or the like, the latter being provided with a burn-off device of conventional design to ignite residual combustibles before discharging the gas into the atmosphere.

The above and other objects, features and advantages of the present invention will become more readily apparent from the following description, reference being made to the accompanying drawing in which:

FIGS. 1–4 are axial cross-sectional views illustrating, in diagrammatic form, several embodiments of my invention.

In FIG. 1, for example, I show a steel-making converter 1 of the Bessemer or Thomas type in a steel-making plant which, in its upright position during the blow, has a mouth 1' opening into a gas-collection member 2 which extends upwardly to a dust-separating column generally designated at 3 and constituting in the system of FIGS. 2–4 the first stage of a gas-collection system.

The elongated tubular gas-collection member 2 is supported at its lower end by conventional means not shown and has a mouth 2' aligned with and spaced above the mouth 1' of the converter 1 and provided with ducts 2a admitting air into the interior 9 of this member in admixture with the carbon-monoxide-containing dust-laden exhaust gas. The mouth 2' is so positioned and the ducts 2a so oriented as to introduce sufficient air into the reaction chamber 9, whose length ranges between 5 and 20 meters, as to sustain an air factor $n$ (i.e. volumetric ratio of combustion-sustaining air to exhaust gas) of substantially $0.05 \leq n \leq 0.5$. The reaction chamber 9 extends upwardly at an angle to the vertical (e.g. 45°) and is of a length sufficient to permit dissipation of part of the sensible heat of the exhaust gas and the heat generated by the substantially complete reaction of oxygen with carbon monoxide in this chamber.

The discharge extremity 2b of the gas-collection member 2 extends vertically upwardly into the dust-separating column 3 and discharges the gas from its circular mouth 6 against a circular impingement body suspended in the column 3 at a temperature of less than the ignition temperature of 650° C. The impingement body 7, which is coaxially positioned in the column 3 and axially aligned with the mouth 6 of the discharge portion 2b, has a diameter D slightly greater than the diameter $d$ of this discharge portion and is spaced therefrom by a distance S equal to a minor fraction of the diameter $d$. The annular gap 8 between the cylindrical walls 3' of column 3 and the impingement body 7 promotes a radial vortex action (arrow 8') with substantially no angular component about the axis 3" of the column 3. Heavier particles entrained by the gas are precipitated by impingement sedimentation and by entrainment with liquid droplets forming a spray 10a directed downwardly from a nozzle 10 disposed above the body 7. The angle α of the spray cone 10a is selected such that the spray impinges on the wall 3' of the column 3 substantially in the horizontal plane P of the impingement surface 7' of the body 7. This impingement surface is convex in the direction of the mouth 6 of the gas-collection member 2.

The column 3 has a sump 3a below the plane P in which the sedimented particles are collected in a sludge 3b and are led therefrom via a conduit 3c and a trap 3d. The nozzle 10 here also forms part of a gas-collection tower whose nozzles 110 are axially spaced along the column 3 and direct respective streams 110a upwardly and downwardly into the column to intercept the rising gases. To promote the washing operation, the column 3 is provided at its upper end with an annular gap washer generally designated 11 and formed by an axially disposed aerodynamic body 11a which fills the gap within an upwardly converging deflector 11b forming a constriction 11c therewith. A jet 110a' is directed upwardly into this gap at which the gases flow with high velocity. In this arrangement, the gas-collection device is part of the column 3 which, at its upper end, is formed with an outlet 4' leading via a duct 4" to an axial intake, tangential outflow blower 4 inducting a reduced pressure at the outlet 4' sufficient to draw the exhaust gases through the system 2, 3 and discharge it into the stack 5 which, at its upper end 5', is provided with a conventional burn-off device such as a fuel-gas nozzle.

In the modification of FIG. 2, the column 203 is provided with a nozzle 10, the impingement body 7, the gas-collection member 2 and reaction chamber 9 as previously described. Above the nozzle 10, however, I provide a heat exchanger 13 of the air-cooled convection type (see Section 11 of Perry's Chemical Engineers' Handbook, supra) in which the temperature and humidity of the gas are reduced to a level compatible with dry electrostatic precipitation (i.e. about 150° C.). The outlet 204' of this column is connected to a dry electrostatic precipitator 12 which, in turn, communicates with the blower 4 and stack 5 previously described. In the system of FIG. 3, the column 303 is provided, above the nozzle 10, with a spray cooler, generally designated 14, consisting of a horizontal array of nozzles 14' spanning the interior of the column and directing jets of water upwardly and downwardly therealong to cool the gas before it enters the wet electrostatic precipitator 312. In the modification of FIG. 4, the column 403 is formed, above the nozzle 10, with a ceramic-interpack cooler 15. From this cooler, the gas passes through a fabric-filter bank or stack 16 and is drawn therethrough via the blower 4 and stack 5.

I claim:

1. An installation for the treatment of converter exhaust gas, comprising in combination with a steelmaking converter having a mouth discharging a dust-laden carbon-monoxide-containing combustible exhaust gas, an elongated tubular gas-collection member forming a reaction chamber and having an inlet end disposed proximally to the mouth of said converter and dimensioned to admit said gas into said chamber together with air in sufficient quantity to effect substantially complete reaction with carbon monoxide in said chamber, said chamber having a length between substantially 5 m. and 20 m. and having a discharge end remote from said converter, said one end of said chamber being formed as a gas-collection hood so arranged and constructed as to admit into said chamber with said gas sufficient air to provide an air factor ranging between substantially 0.05 and 0.5 in said chamber;

an upright dust-separating column communicating with said discharge end of said reaction chamber, said reaction chamber extending into said column upwardly and with all-around clearance, said column being provided at its bottom with means for removing collected particulate matter therefrom; and a deflection body disposed immediately ahead of said discharge end in said column and coaxial therewith and with said reaction chamber in the path of the gases emerging from said reaction chamber into said column to produce radial turbulence therein as the gas emerges from said discharge end, said deflection body having an impingement face disposed above said discharge end of said reaction chamber and of a cross-section exceeding that of said discharge end of said chamber.

2. The installation defined in claim 1 wherein said said deflection body is downwardly convex and is spaced from said discharge end of said chamber by a distance less than the diameter of said discharge end, said column being provided with a nozzle for directing a spray of a washing liquid downwardly into said gap, said nozzle being coaxially aligned with said discharge end and said deflection body and having a spray cone directed into said gap.

3. The installation defined in claim 2 wherein said column is provided at its upper end with an outlet sustaining a reduced pressure sufficient to draw said gas through said chamber and column and means for washing rising gases with a liquid washing medium above said nozzle.

4. The installation defined in claim 2 wherein said column is provided at its upper end with an outlet sustaining a reduced pressure sufficient to draw said gas through said chamber and column, and heat-exchanger means above said nozzle for cooling the gases rising in said column, said installation further comprising a dust-removal device connected to said column at said outlet.

5. The installation defined in claim 4 wherein said dust-removal device is an electrostatic precipitator.

6. The installation defined in claim 4 wherein said dust-removal device is a filter.

7. An installation for the treatment of converter exhaust gas comprising, in combination with a steel-making converter having a mouth discharging a dust-laden carbon-monoxide-containing combustible exhaust gas:

(a) an elongated tubular gas-collection member lying in a vertical plane but inclined to the vertical axis of said converter in an upwardly oriented position thereof, said member forming a cylindrical reaction chamber having a downwardly turned inlet and forming a hood disposed proximally to the mouth of said converter and dimensioned so at to admit into said chamber with said gas sufficient air to provide an air factor ranging between substantially 0.05 and 0.5 in said chamber and sufficient air to effect substantially complete reaction with carbon monoxide therein, said chamber having a length between substantially 5 meter and 20 meter and having an upwardly turned discharge end remote from said converter, said chamber being formed in the region of said inlet and with ducts admitting air thereto;

(b) an upright cylindrical dust-separating column receiving said discharge end of said reaction chamber with all around clearance and coaxial with said discharge end whereby said column below the mouth of said discharge end forms a compartment for collecting water-entrained particles removed from said column, said column being formed at said lower end with a discharge conduit and a liquid trap connecting said compartment with said conduit, said column having an outlet at its upper end:

(c) a deflection body disposed immediately ahead of said mouth of said discharge end in said column and coaxial with said column and said discharge end, said body having a downwardly convex face confronting said mouth of said discharge end and having an area at least equal to the flow cross-section area of said discharge end and spaced therefrom by a distance less than the diameter of said discharge end, said body being positioned in said column to define therein an annular gap sustaining gas turbulence in the form of a ring as gasses emitted from said discharge end enter said column;

(d) a plurality of axially spaced nozzles in said column above said body for directing respective generally conical sprays of water coaxial with said column against the interior wall thereof and into said gap for washing dust from the gas rising in said column into said compartment;

(e) constrictor means in said column coaxial with said nozzles and disposed between said nozzles and said outlet forming a constriction for the washed gasses rising in said column, and a further body received in said constrictor means and coaxial therewith to form with said constrictor means an annular-gap washer, said nozzles dispensing at least one jet upwardly into the gap of said annular-gap washer;

(f) a duct leading from said outlet;

(g) blower means connected to said duct for drawing gas therethrough and through said column;

(h) a stack communicating at its lower end with said blower means for receiving the gas of said duct and dispensing it at the upper end of said stack into the atmosphere; and (i) burn-off means at the upper end of said stack for eliminating any residual combustible components of the gas disposed into the atmosphere.

References Cited

UNITED STATES PATENTS

| | | | |
|---|---|---|---|
| 1,508,367 | 9/1924 | Matlock | 55—135 X |
| 2,387,345 | 10/1945 | Pearl | 261—126 |
| 2,653,674 | 9/1953 | Ortgies | 261—126 X |
| 2,643,867 | 6/1953 | Schneible et al. | 261—112 X |
| 2,646,263 | 7/1953 | Goldberg | 110—119 |
| 2,653,674 | 9/1953 | Ortgies | 261—126 X |
| 2,778,442 | 1/1952 | Jenkins et al. | |
| 2,815,278 | 12/1957 | Wilkins | 261—31 X |
| 3,045,990 | 7/1962 | Keenan | 261—120 |
| 3,134,835 | 5/1964 | Okaniwa | 75—60 X |
| 3,197,186 | 7/1965 | Mirigay | 266—15 |
| 3,315,443 | 4/1967 | Marino | 55—85 |
| 3,357,820 | 12/1967 | Rasworschegg et al. | 75—60 |

FOREIGN PATENTS

| | | |
|---|---|---|
| 25,158 | 8/1930 | Australia. |
| 972,340 | 7/1959 | Germany. |
| 116,876 | 6/1918 | Great Britain. |

OTHER REFERENCES

Willet et al., "The Venturi Scrubber for Cleaning Oxygen." Iron and Steel Engineer, July 1961, pages 126–131 (Copy in Group 177 class 261 subclass 31).

Bulletin by Claude B. Schneible Company, P.O. Box 81, North End Station, Detroit, Mich., printed May 10, 1954, 4 pages.

HARRY B. THORNTON, Primary Examiner

DENNIS E. TALBERT, JR., Assistant Examiner

U.S. Cl. X.R.

23—2, 150; 55—259, 260, 269, 315, 385, 68; 98—115; 110—119; 261—17, 126, 118; 266—31, 35